US012737143B2

(12) United States Patent
Lee et al.

(10) Patent No.: US 12,737,143 B2
(45) Date of Patent: Sep. 15, 2026

(54) PERFORMANCE FOR DUPLEX PRINTING OF DOCUMENTS

(71) Applicant: Hewlett-Packard Development Company, L.P., Spring, TX (US)

(72) Inventors: Uichoon Lee, Seongnam Si (KR); Gyeonghun Jo, Seongnam Si (KR); Hyunsoo Song, Seongnam Si (KR); Hojin Ryu, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 239 days.

(21) Appl. No.: 18/702,615

(22) PCT Filed: Apr. 7, 2022

(86) PCT No.: PCT/US2022/023825
§ 371 (c)(1),
(2) Date: Apr. 18, 2024

(87) PCT Pub. No.: WO2023/069137
PCT Pub. Date: Apr. 27, 2023

(65) Prior Publication Data

US 2024/0419370 A1 Dec. 19, 2024

(30) Foreign Application Priority Data

Oct. 22, 2021 (KR) ........................ 10-2021-0141891

(51) Int. Cl.
*G06F 3/12* (2006.01)
*H04N 1/00* (2006.01)

(52) U.S. Cl.
CPC ............ *G06F 3/1205* (2013.01); *G06F 3/125* (2013.01); *H04N 1/00572* (2013.01)

(58) Field of Classification Search
CPC .................. G06F 3/1205; G06F 3/125; H04N 1/00572; H04N 1/00631; H04N 1/2307;
(Continued)

(56) References Cited

U.S. PATENT DOCUMENTS 4,673,279 A * 6/1987 Brown ................. G03G 15/234 355/25
4,970,543 A * 11/1990 Ito ...................... G03B 27/6257 355/24

(Continued)

FOREIGN PATENT DOCUMENTS

JP 57-171353 A 10/1982
JP 2004-226586 A 8/2004

(Continued)

*Primary Examiner* — Iriana Cruz
(74) *Attorney, Agent, or Firm* — Foley & Lardner LLP

(57) ABSTRACT

An example image forming apparatus includes an image forming part, a plurality of batches type sheet-feeding part to sequentially feed a plurality of sheets, and a processor. The processor is to reconfigure, based on receiving a print command to duplex print a document into a plurality of copies, a printing order of the plurality of copies to one print job with respect to the print command, control the plurality of batches type sheet-feeding part to feed sheets to feed sheets according to the reconfigured printing order, and control the image forming part to print the document according to the reconfigured printing order.

13 Claims, 16 Drawing Sheets

(58) Field of Classification Search
CPC ....... H04N 2201/0094; G03G 15/5062; G03G 15/5083; G03G 15/231
See application file for complete search history.

(56) References Cited

U.S. PATENT DOCUMENTS

| | | | | |
|---|---|---|---|---|
| 6,018,398 | A * | 1/2000 | Bunker | G06K 15/00 358/1.15 |
| 2006/0133844 | A1* | 6/2006 | Konno | B41J 3/60 399/82 |
| 2006/0291890 | A1 | 12/2006 | Park | |
| 2010/0110483 | A1 | 5/2010 | Igarashi | |
| 2010/0128307 | A1* | 5/2010 | Yoo | G06F 3/1211 358/1.15 |
| 2010/0189458 | A1 | 7/2010 | Miyahara | |
| 2011/0058871 | A1* | 3/2011 | Motoyama | G03G 15/232 399/364 |
| 2014/0192382 | A1* | 7/2014 | Yamanouchi | B41J 3/60 358/1.18 |
| 2018/0056679 | A1* | 3/2018 | Vestjens | B65H 85/00 |

FOREIGN PATENT DOCUMENTS

| | | | |
|---|---|---|---|
| JP | 2010-105350 | A | 5/2010 |
| JP | 2015-131491 | A | 7/2015 |
| KR | 10-0629486 | B1 | 9/2006 |
| KR | 10-1304462 | B1 | 9/2013 |

* cited by examiner

300
COPY 1
COPY 2
COPY 3
SHEET 1
SHEET 2
SHEET 3
SHEET 4
SHEET 5
SHEET 6
SHEET FEEDING ORDER

400
COPY 1
COPY 2
COPY 3
SHEET 1
SHEET 2
SHEET 3
SHEET 4
SHEET 5
SHEET 6
2 (S1)
1 (S1)
B (S2)
3 (S2)
2 (S3)
1 (S3)
B (S4)
3 (S4)
2 (S5)
1 (S5)
B (S6)
3 (S6)
410
SHEET FEEDING ORDER

Figure 5:
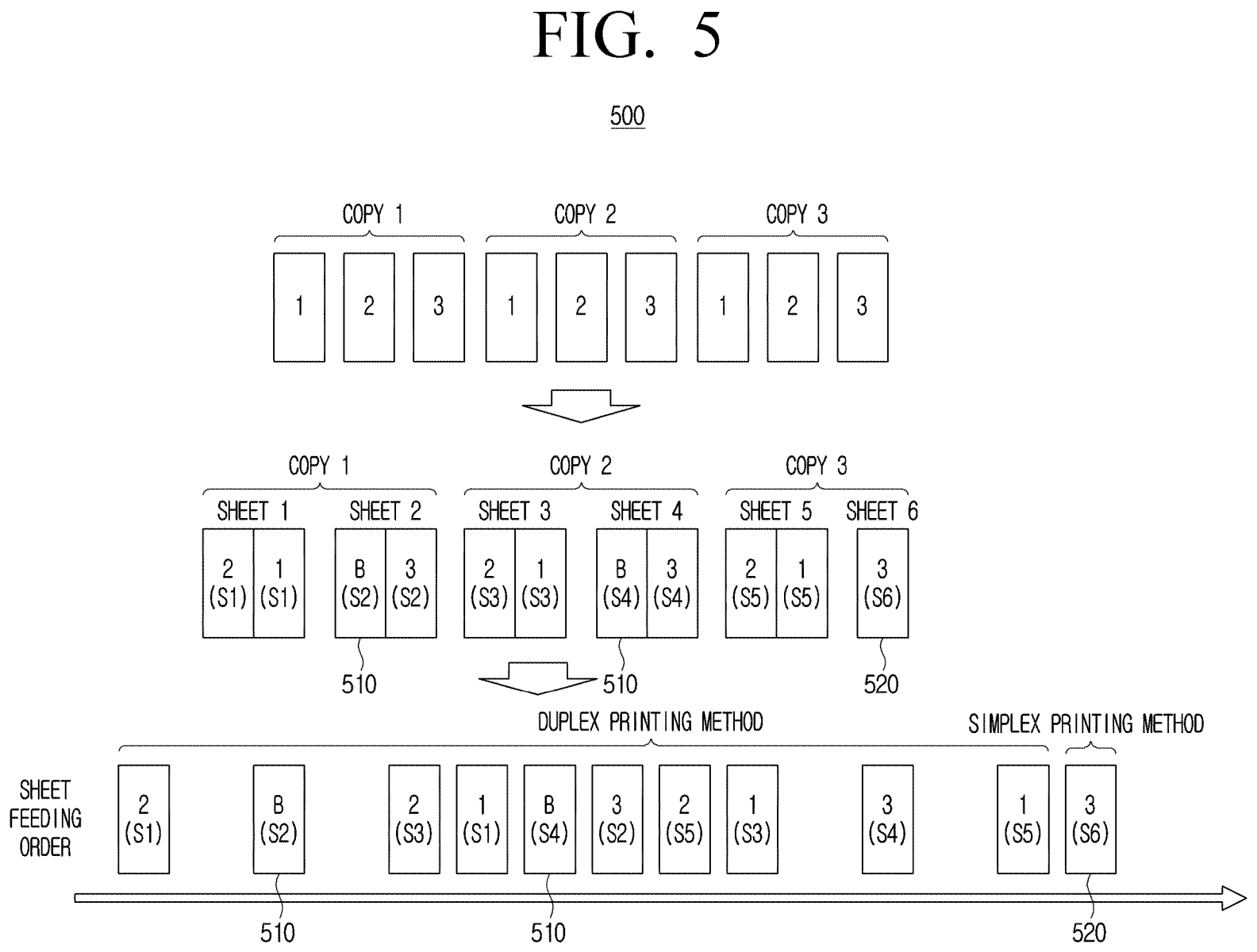

COPY 1: 1 2 3
COPY 2: 1 2 3
COPY 3: 1 2 3

COPY 1
SHEET 1: 2 (S1) | 1 (S1)
SHEET 2: B (S2) | 3 (S2) — 510

COPY 2
SHEET 3: 2 (S3) | 1 (S3)
SHEET 4: B (S4) | 3 (S4) — 510

COPY 3
SHEET 5: 2 (S5) | 1 (S5)
SHEET 6: 3 (S6) — 520

SHEET FEEDING ORDER

DUPLEX PRINTING METHOD: 2 (S1), B (S2) — 510, 2 (S3), 1 (S1), B (S4) — 510, 3 (S2), 2 (S5), 1 (S3), 3 (S4), 1 (S5)

SIMPLEX PRINTING METHOD: 3 (S6) — 520

Figure 6:
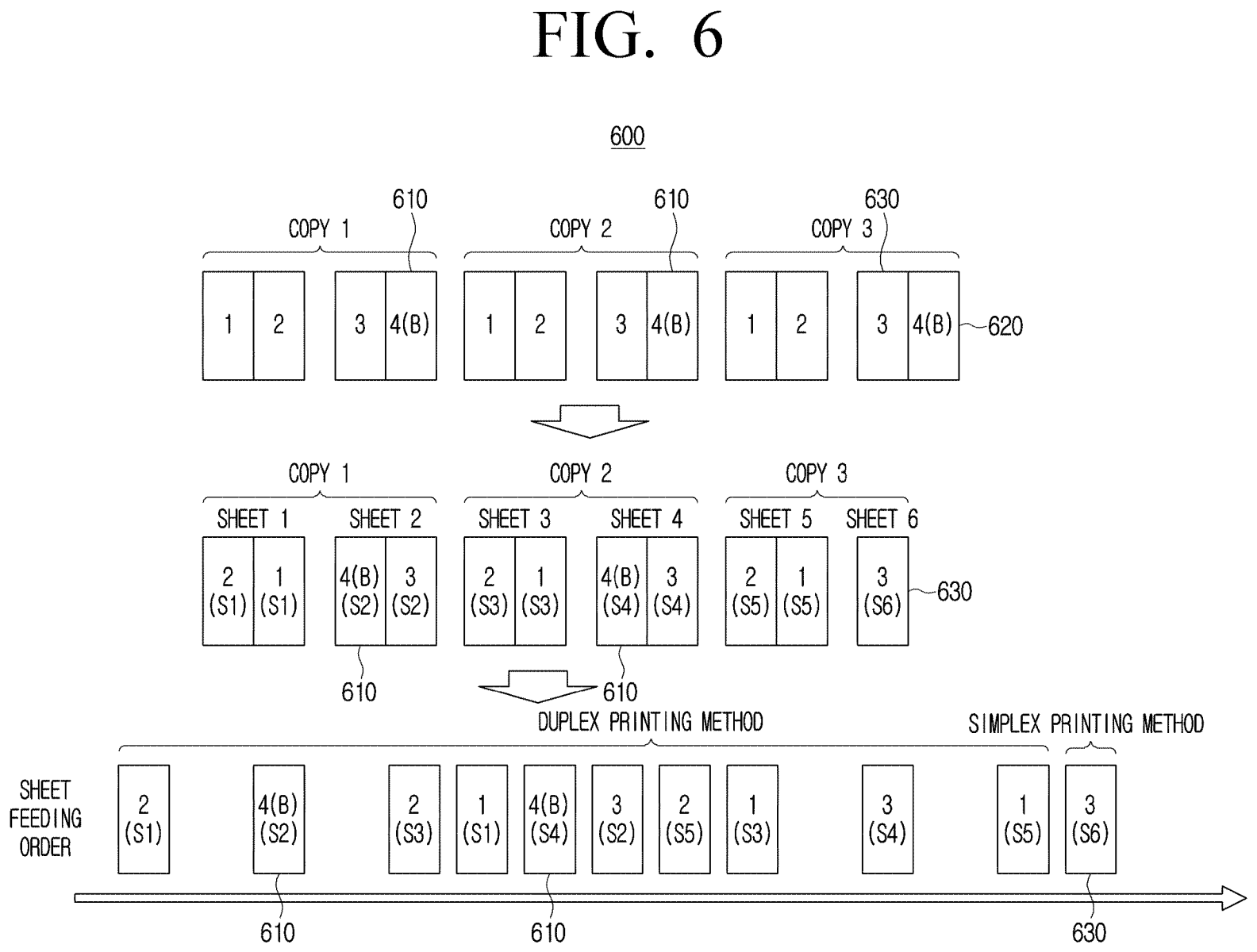

COPY 1
1 | 2 | 3 | 4(B)
610

COPY 2
1 | 2 | 3 | 4(B)
610

COPY 3
1 | 2 | 3 | 4(B)
630
620

COPY 1
SHEET 1: 2 (S1) | 1 (S1)
SHEET 2: 4(B) (S2) | 3 (S2)
610

COPY 2
SHEET 3: 2 (S3) | 1 (S3)
SHEET 4: 4(B) (S4) | 3 (S4)
610

COPY 3
SHEET 5: 2 (S5) | 1 (S5)
SHEET 6: 3 (S6)
630

DUPLEX PRINTING METHOD
2 (S1)
4(B) (S2)
610
2 (S3)
1 (S1)
4(B) (S4)
610
3 (S2)
2 (S5)
1 (S3)
3 (S4)
1 (S5)

SIMPLEX PRINTING METHOD
3 (S6)
630

SHEET FEEDING ORDER

700
COPY 1
COPY 2
COPY 3
710
1
2
3
4(B)
SHEET 1
SHEET 2
SHEET 3
SHEET 4
SHEET 5
SHEET 6
2 (S1)
1 (S1)
4(B) (S2)
3 (S2)
2 (S3)
1 (S3)
4(B) (S4)
3 (S4)
2 (S5)
1 (S5)
4(B) (S6)
3 (S6)
SHEET FEEDING ORDER
OPERATION
STOPPED
DEVELOPING UNIT OPERATING SIGNAL
t1
t2
t3

PERFORMANCE FOR DUPLEX PRINTING OF DOCUMENTS

BACKGROUND

An image forming apparatus may refer to an apparatus which prints print data generated from a terminal device such as a computer to a printing sheet. Examples of the image forming apparatus may include a copier, a printer, a facsimile, a scanner, or a multi-function peripheral (MFP) which implements in combination functions of the copier, the printer, the facsimile, and the scanner through one device.

BRIEF DESCRIPTION OF THE DRAWINGS

Various examples will be described below by referring to the following figures.

FIG. 3 to FIG. 6 are diagrams illustrating a reconfiguration of a printing order in duplex printing of a plurality of copies according to various examples;

DETAILED DESCRIPTION

Examples described herein are to assist in an understanding of the disclosure, and it should be understood that the disclosure may be variously modified and implemented from the examples described herein.

Terms used in the following description are general terms that have been selected considering their function herein. However, the terms may change depending on intention, legal or technical interpretation, emergence of new technologies, and the like.

In addition, there may be terms arbitrarily selected. In this case, the terms may be interpreted as defined in the detailed description or may be interpreted based on the overall context of the disclosure and the technical sense of the related art unless otherwise specified.

Further, while the detailed description describes elements included in each example of the disclosure, the disclosure is not limited to the respective examples. Accordingly, some elements may be modified or omitted, and other elements may be added. In addition, the elements may be disposed or distributed in different independent devices.

In a case in which an element is described as connected to another element, the elements may be directly connected, but may also be connected through another element therebetween. In addition, in a case in which an element is described as including or comprising another element, this refers to a situation in which another element may be additionally included rather than excluding other elements, unless otherwise specified.

In describing the disclosure, the order of each operation is to be understood as non-limiting unless the order of each operation is described as being performed logically and temporally prior to a following operation. That is, except for exceptional cases as described above, even if a process described as the following operation is performed preceding a process described as the preceding operation, it does not influence the nature of the disclosure and the scope of protection should also be defined regardless of the order of the operation.

Although examples of the disclosure will be described with reference to the accompanying drawings and the descriptions described in the accompanying drawings, the disclosure is not limited by or is limited to the examples.

Examples of the disclosure will be described below with reference to the accompanied drawings.

Figure 1:
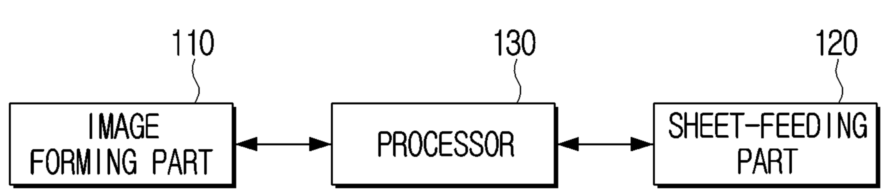
FIG. 1 is a block diagram illustrating an image forming apparatus according to an example.

FIG. 1 is a block diagram illustrating an image forming apparatus according to an example.

Referring to FIG. 1, an image forming apparatus 100 may include an image forming part 110, a sheet-feeding part 120, and a processor 130.

The image forming apparatus 100 may be an apparatus capable of performing various image forming jobs. Examples of the image forming apparatus may include a copier, a printer, a facsimile, a scanner, or a multi-function peripheral (MFP) which implements in combination functions of the copier, the printer, the facsimile, and the scanner, through one device, but is not limited thereto.

In the disclosure, an image forming job may refer to various jobs (e.g., copy, print, scan, or fax) associated with an image such as the generating of an image or the generating, storing, transmitting, and the like of an image file, and 'job' may refer to an image forming job, but may also refer to any of a series of processes used to perform the image forming job.

The image forming part 110 may be an element to perform the image forming job, and may perform at least one process from among the processes of the image forming job.

Examples of processes of an image forming job may include a charging process of charging a photoconductor, an exposure process of forming a latent image on the photoconductor, a development process of developing the latent image to an image, a transfer process of transferring the image to a printing sheet, a fusing process of fusing the transferred image to the printing sheet, and the like.

The sheet-feeding part 120 may feed, in order for the image forming part 110 to perform the image forming job, sheets of a printing medium to a location at which the image forming job is performed. The sheet-feeding part 120 may control a feeding of sheets from among the image forming jobs. In an example, the sheet-feeding part 120 may perform feeding of the printing sheets from a tray provided with the printing sheets to a location at which a transfer job is performed in the image forming part 110, but is not limited thereto.

In addition, the sheet-feeding part 120 may feed, based on a print method of the image forming apparatus 100 being a simplex printing method, sheets to a simplex printing path, and feed, based on the print method being a duplex printing method, sheets to a duplex printing path.

According to an example, the sheet-feeding part 120 may include a plurality of batches type sheet-feeding part 120 which sequentially feeds a plurality of printing sheets according to a printing order.

The image forming apparatus 100 may perform, based on performing printing using the duplex printing method, the image forming job on one surface of the sheet and perform a process of turning over the sheet to perform the image forming job on the other surface.

The sheet-feeding part 120 may feed, while the process of turning over the sheet is being performed in the image forming apparatus 100, a different sheet to the image forming part 110 so as to perform the image forming job on the different sheet. Based on being implemented with a 2-batch type sheet-feeding part 120, another one sheet may be fed while the process of turning over the sheet is being performed. Based on being implemented with a 3-batch type sheet-feeding part, another two sheets may be fed while the process of turning over the sheet is being performed.

The processor 130 may control an operation of the image forming apparatus 100 according to the various examples. The processor 130 may be implemented as a central processing unit (CPU), an application-specific integrated circuit (ASIC), a system on chip (SoC), or the like, but is not limited thereto.

Figure 3:
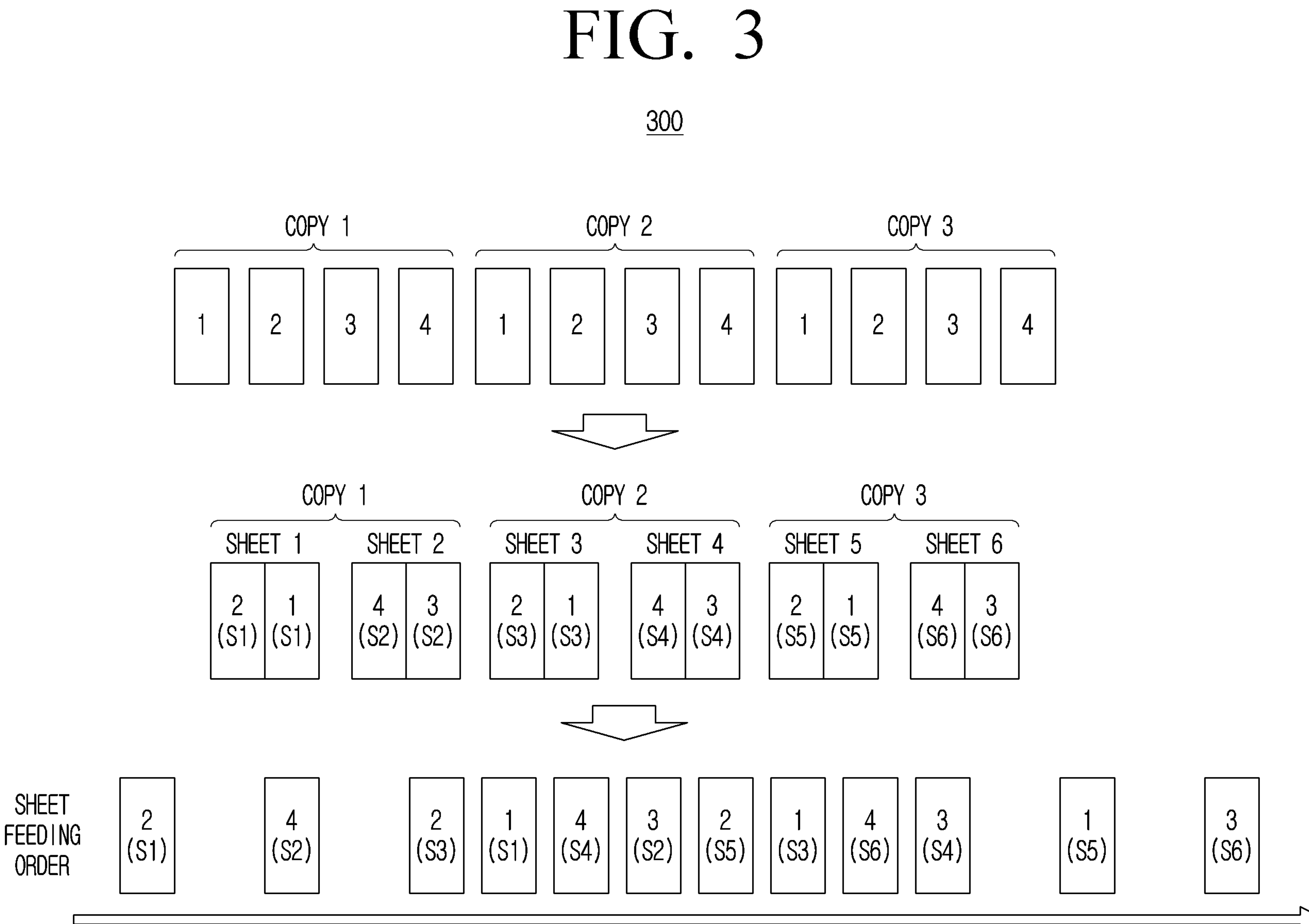

The processor 130 may perform various operations based on data or instructions stored in a memory (e.g., memory 140, FIG. 3). For example, the processor 130 may execute a program stored in the memory, read a file stored in the memory, or store a new file in the memory.

In addition, the processor 130 may control, based on a print command on a document being input, the image forming part 110 to perform the print operation.

Figure 2:
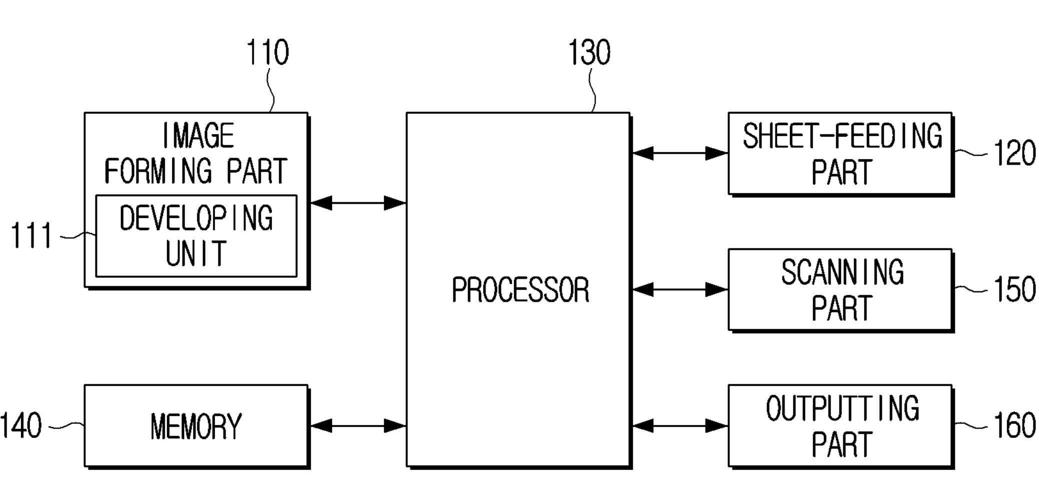
FIG. 2 is a block diagram illustrating an image forming apparatus according to an example.

FIG. 2 is a block diagram illustrating an image forming apparatus according to an example.

Referring to FIG. 2, the image forming apparatus 100 may include the image forming part 110, the sheet-feeding part 120, and the processor 130, and further include the memory 140, a scanning part 150, and an outputting part 160.

Referring to FIG. 2, the image forming part 110 may include a developing unit 111. The developing unit 111 may perform a development process of developing a latent image to an image. For convenience of description, although the image forming part 110 has been illustrated in FIG. 2 as including the developing unit 111 and not including other units, the image forming part 110 may further include various units such as a photoconductor, a charging unit, a laser scanning unit (LSU), a transfer unit, a fusing unit, a cleaning unit, and the like.

The developing unit 111 may contain a developer and supply the developer to an electrostatic latent image which is formed on a surface of the photoconductor to develop the electrostatic latent image into a visible image. The developing unit 111 may include a developing roller to supply the developer to the electrostatic latent image. The developer may be supplied from the developing roller to the electrostatic latent image formed on the photoconductor by a developing electric field which is formed between the developing roller and the photoconductor.

The developer may be used every time the image forming job is carried out and depleted based on being used for a predetermined time or more. In this case, the developing unit 111 may be replaced.

The memory 140 may be an element to store various data and programs used in operations of the image forming apparatus 100.

The memory 140 may be implemented as a storage medium in the image forming apparatus 100, such as, for example, and without limitation, a hard-disk drive (HDD), a solid-state drive (SDD), and the like, and an external storage medium such as, for example, and without limitation, a removable disk such as a universal serial bus (USB) memory, a web server through a network, and the like. The memory 140 may store various data or instructions corresponding to the various examples.

The scanning part 150 may irradiate light to a document, receive light which is reflected, and read an image recorded on a document. The scanning part 150 may include an image sensor, such as, for example, and without limitation a charge coupled device (CCD), a contact type image sensor (CIS), or the like which reads the image from the document. The scanning part 150 may have a flatbed structure in which a document is positioned at a fixed position and an image is read while the image sensor is being moved, a document feed structure in which the image sensor is positioned at a fixed position and the document is fed, or a combined structure thereof.

The processor 130 may perform, based on a copy command being input, a scan job on a document to be copied by controlling the scanning part 150, and control the sheet-feeding part 120 to feed the printing sheet to the image forming part 110. The copy command may be directly input through a user interface, which is provided in the image forming apparatus itself, or may be input through a terminal device which is connected to the image forming apparatus.

The outputting part 160 may feed the sheet on which the image forming job is completed and output the sheet to a tray of the image forming apparatus 100.

Based on a plurality of trays being included in the image forming apparatus 100, the outputting part 160 may output sheets on which the image forming jobs are completed to the respective trays.

Based on the sheet-feeding part 120 being a plurality of batches type sheet-feeding part 120, in a situation in which the printing of a subsequent copy starts before the printing of the previous copy is completed based on duplex printing a document into a plurality of copies, a section in which a print section of each copy overlaps may occur. Accordingly, in the plurality of batches type sheet-feeding part 120, there may be a need to reconfigure the printing order according to a sheet feeding order of the plurality of batches type sheet-feeding part 120 rather than printing according to a page order.

Accordingly, in various examples as described below, the image forming apparatus 100 including the plurality of batches type sheet-feeding part 120 may reconfigure the printing order on a document of a plurality of copies to one print job and perform printing of the document.

FIG. 3 to FIG. 6 are diagrams illustrating a reconfiguration of a printing order in duplex printing of a plurality of copies according to various examples.

Referring to FIG. 3, the processor 130 may reconfigure, based on a received print command to duplex print a plurality of copies of a document, a printing order of the plurality of copies to one print job with respect to the print command.

According to an example, FIG. 3 shows a reconfiguration 300 of the printing order in a 3-batch type sheet-feeding part 120 based on duplex printing three copies of a 4-page document.

The processor 130 may reconfigure, based on a received print command to duplex print a plurality of copies of the document, the order so that two pages correspond to one sheet. In an example, a reason that a subsequent number page is printed first is because the page printed last is output to a front surface based on sheets being output. However, the example is not limited thereto. An example method of reconfiguring the printing order may be set differently according to an output method of the image forming apparatus. The processor 130 may reconfigure the printing order according to the sheet feeding order of the plurality of batches type sheet-feeding part 120.

According to an example, in the 3-batch type sheet-feeding part 120, page 2 of a first sheet S1 may be printed, and while performing the process of turning over the corresponding sheet S1 to print page 1, a second sheet S2 and a third sheet S3 may be sequentially fed.

In the example of FIG. 3, page 1 of the first sheet S1 may be printed after page 2 of the third sheet S3 is printed, the first sheet S1 may be output to the tray through the outputting part 160, and a fourth sheet S4 may be fed through the sheet-feeding part 120.

According to the printing order, the feeding of a last sheet S6 may start after the third sheet S3 is output, and a sixth sheet S6 may also be output after a fifth sheet S5 is output.

Figure 4:
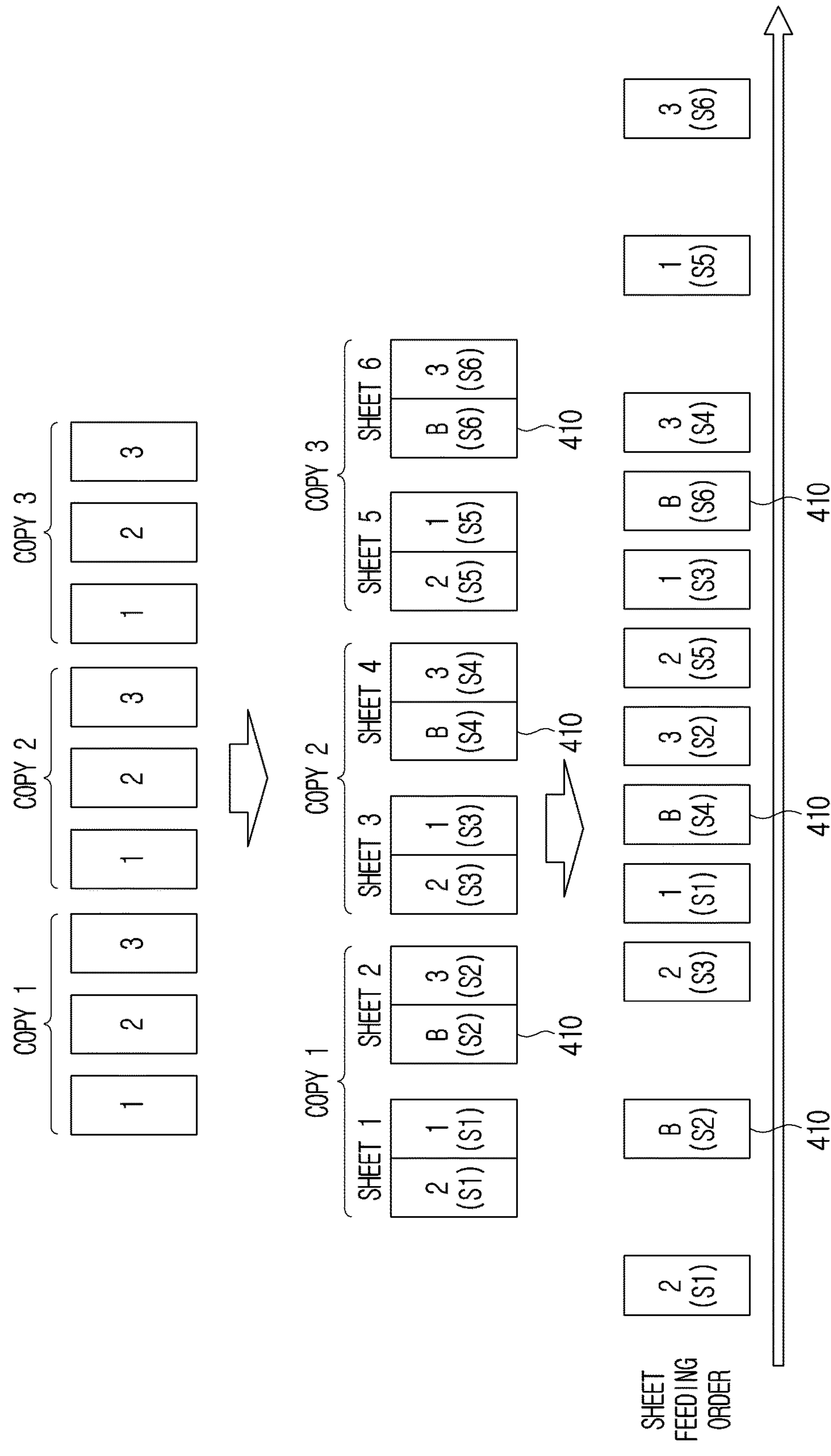

As described above, based on performing duplex printing using the plurality of batches type sheet-feeding part 120, the processor 130 may reconfigure the printing order of all pages to one print job, and control the plurality of batches type sheet-feeding part 120 to feed the sheets according to the reconfigured printing order. FIG. 4 shows an example of duplex printing a plurality of copies of a document having an odd number of pages, for example, a case of duplex printing a 3-page document into three copies.

The processor 130 may add, based on receiving a print command to duplex print a document having an odd number of pages into a plurality of copies, a blank sheet page 410 as the last page of the document to make the total page number of the document an even number. The blank sheet page 410 may refer to a blank sheet state without any content being printed despite the printing sheet being output through the image forming part.

In an example, based on not adding the blank sheet page 410 as the last page of the document having an odd number of total pages and printing the document using the duplex printing method, the front side may be printed with page 3, and the back page may be printed with page 1 on the second sheet S2. Accordingly, printing with the duplex printing method may be carried out after the total page number of the document is made an even number by adding the blank sheet page 410 as the last page of the document having an odd number of total pages.

In an example, based on receiving a duplex printing command for three copies of a 3-page document, the processor 130 may reconfigure the sheet printing order as illustrated in reconfiguration 400 in FIG. 4. In the example of FIG. 4, page 2 may be first printed in the first sheet (i.e., sheet 1), and the sheet may be output by printing page 1 after turning over the sheet. With the second sheet, the sheet may be fed without performing the print job on the added blank sheet page, and the sheet may be output by printing page 3 after turning over the sheet.

The processor 130 may add the blank sheet page to the end of the document (i.e., a last page of the document) with respect to duplex printing a plurality of copies of a document having an odd number of total pages, and reconfigure the printing order on the plurality of copies for all of the pages which includes the added blank sheet page as one print job. Because the sheet feeding order in the 3-batch type sheet-feeding part 120 has been described above, redundant descriptions thereof will be omitted.

FIG. 5 illustrates an example of duplex printing an odd page document into a plurality of copies, for example, a case of duplex printing a 3-page document into three copies.

Compared with FIG. 4, the processor 130 may add a blank sheet page 510 as the last page of the document including the odd number of pages. However, the blank sheet page 510 may be added as the last page of the document except for the last copy. For example, the processor 130 may make the total page number of the document except for the last copy an even number and reconfigure the printing order on all of the plurality of copies to one print job.

A reconfiguration 500 of a printing order according to an example is as shown in FIG. 5. The processor 130 may reconfigure the printing order according to the sheet feeding order of the plurality of batches type sheet-feeding part 120 with respect to a page except for a last page 520 of all copies, and add the last page 520 to the last of the reconfigured printing order to reconfigure the whole printing order to one print job. The printing order of FIG. 5 according to an example may show the reconfigured printing order with respect to the 3-batch type sheet-feeding part 120.

In an example, the processor 130 may control the image forming part 110 to print the remaining pages except for the last page 520 of the last copy using the duplex printing method according to the reconfigured printing order, and print the last page 520 of the last copy using the simplex printing method. Accordingly, the processor 130 may print the last page 520 using the simplex printing method without performing the process of turning over the last sheet (i.e., sheet 6) of the last copy. Compared with FIG. 4, FIG. 5 shows the feeding of the last sheet S6 being performed after the fifth sheet S5 is output, and not performed after the third sheet S3 is output.

Based on printing the total copies of the document using the duplex printing method as in FIG. 4, because the sheet (i.e., sheet 6) including the last page of the last copy is also printed using the duplex printing method, a printing time may be the time taken to feed sheets totaling sixteen pages including an idle period during which a print job is not performed. However, based on printing the last page 520 of the last copy using the simplex printing method as in FIG. 5, the printing time may be the time taken to feed sheets totaling fifteen pages. Accordingly, by printing the last page 520 using the simplex printing method, and comparing with printing the total pages using the duplex printing method, time may be reduced as much as the time spent in printing one page.

The above-described duplex printing process of a document having an odd number of pages may be applied even based on receiving a command for duplex copying a simplex printed document of an odd number of pages into a plurality of copies.

The processor 130 may control the scanning part 150 to simplex scan the document based on receiving a copying command for duplex copying a simplex printed document having an odd number of pages into a plurality of copies. In addition, the processor 130 may add the blank sheet page as the last page of the scanned document as described above to make the total page number of the scanned document an even number. The processor 130 may reconfigure the printing order on all of the plurality of copies except for the added blank sheet page of the last copy of the scanned document to one print job. The reconfigured printing order may be as in FIG. 5. The processor 130 may control the image forming part 110 to print the remaining pages except for the last page of the last copy using the duplex printing method, and print the last page of the last copy using the simplex printing method.

FIG. 6 is a diagram illustrating a reconfigured printing order in case a duplex printed document is duplex copied to a plurality of copies according to an example.

The processor 130 may control the scanning part 150 to duplex scan the document based on receiving a copy command for duplex copying the duplex printed document into a plurality of copies. In FIG. 6, an example of duplex scanning a 4-page duplex printed document is illustrated.

FIG. 6 illustrates a reconfiguration 600 in which the processor 130 may reconfigure, based on a last page 610 of the scanned document being a blank sheet page, the printing order on the plurality of copies except for a last blank sheet page 620 of the last copy (i.e., copy 3) to one print job. The example printing order of FIG. 6 may show the reconfigured printing order with respect to the 3-batch type sheet-feeding part. According to an example, the processor 130 may reconfigure the printing order according to the sheet feeding order of the plurality of batches type sheet-feeding part 120 with respect to the remaining pages except for the page of the last sheet (i.e., S6), and add a previous page 630 of the last blank sheet page 620 to the last of the reconfigured printing order to reconfigure the whole printing order to one print job.

The processor 130 may control the image forming part 110 to print the remaining pages except for the previous page 630 of the excluded last blank sheet page 620 using the duplex printing method. Further, the processor 130 may control the image forming part 110 to print the previous page 630 of the excluded last blank sheet page 620 using the simplex printing method.

Because examples associated with simplex printing of the last sheet are described above, redundant descriptions thereof will be omitted.

Figure 7:
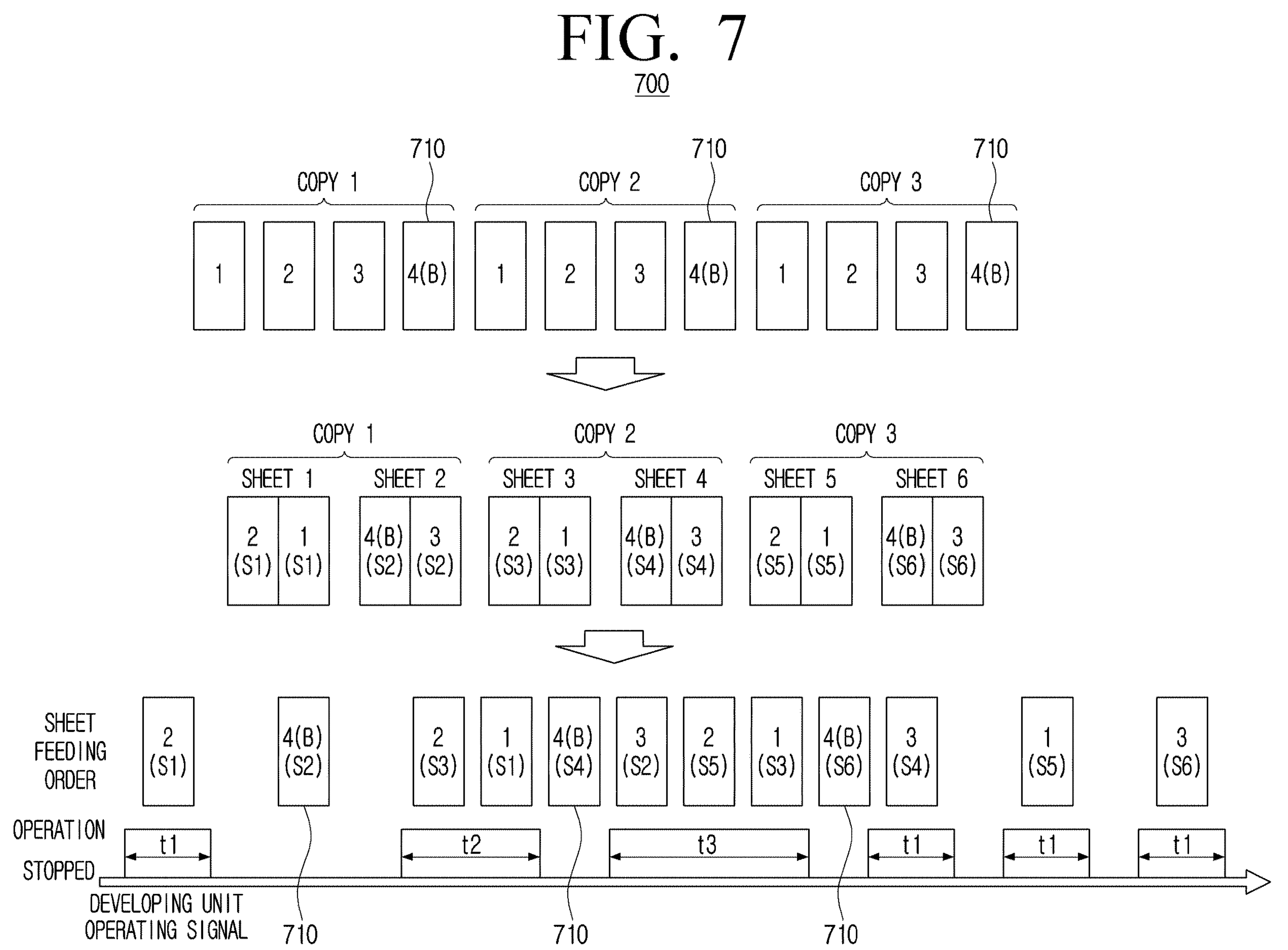
FIG. 7 is a diagram illustrating a control method of a developing unit according to an example.

FIG. 7 is a diagram illustrating a control method of a developing unit according to an example.

Referring to FIG. 7, the developing unit 111 of the image forming part 110 may be operated while the image forming job is being performed, and may be operated with respect to the blank sheet page included in the document. Accordingly, because the developing unit 111 idly rotates without performing the development process in the print section of the blank sheet page, a lifespan of the developing unit 111 is reduced, which may result in needing to replace the developing unit.

With respect to the operation of the developing unit 111, the processor 130 may store, based on receiving a print command of the document, information on the blank sheet page included in the document in the memory 140. In an example, the processor 130 may detect, based on there being no color component in the image data of the document, or the color component being less than or equal to a set value, the corresponding page as the blank sheet page.

In an example, based on the R, G, B values of the image data of the document being 0 or shown as a very small value, the processor 130 may detect the corresponding page as the blank sheet page, and store the information on the blank sheet page in the memory 140. The information on the page may include information on a page number of the page, whether there is a blank sheet page, and the like, but is not limited thereto.

The processor 130 may control, based on information on the blank sheet page stored in the memory 140, the image forming part 110 to stop the operation of the developing unit 111 at the print section of the blank sheet page.

According to an example, the processor 130 may store information on the blank sheet page present in an existing document, and also store information on the blank sheet page added to print the odd page document using the duplex printing method in the memory 140. In an example, the processor 130 may stop the operation of the developing unit 111 in the print section of the blank sheet page to prevent unnecessary reduction in lifespan of the developing unit 111.

FIG. 7 shows an example of a reconfiguration 700 including a fourth page 710 from among a 4-page document being a blank sheet page.

According to an example, the processor 130 may store, based on receiving a document print command, information on a blank sheet page 710 included in the document in the memory 140. Further, based on the information stored in the memory 140, the image forming part 110 may be controlled to stop the developing unit 111 in the print section of the blank sheet page 710.

Because the developing unit 111 may be stopped at the print section of the blank sheet page 710 as in FIG. 7, the developing unit 111 may be operated during a total time of t1+t2+t3+t1+t1+t1 while the image forming job is being performed. Here, t1 may be a time spent in printing page 1 of the document, and t2 and t3 may be time spent in printing page 2 and page 3 of the document, respectively.

If the blank sheet page 710 is not identified and the image forming job is performed on all pages including the blank sheet page 710, the developing unit 111 may be operated as much as the time spent in printing a 12-page document. Accordingly, based on performing the image forming job by identifying the blank sheet page in printing pages of a same number, there is the effect of reducing an operation time of the developing unit 111.

Figure 8:
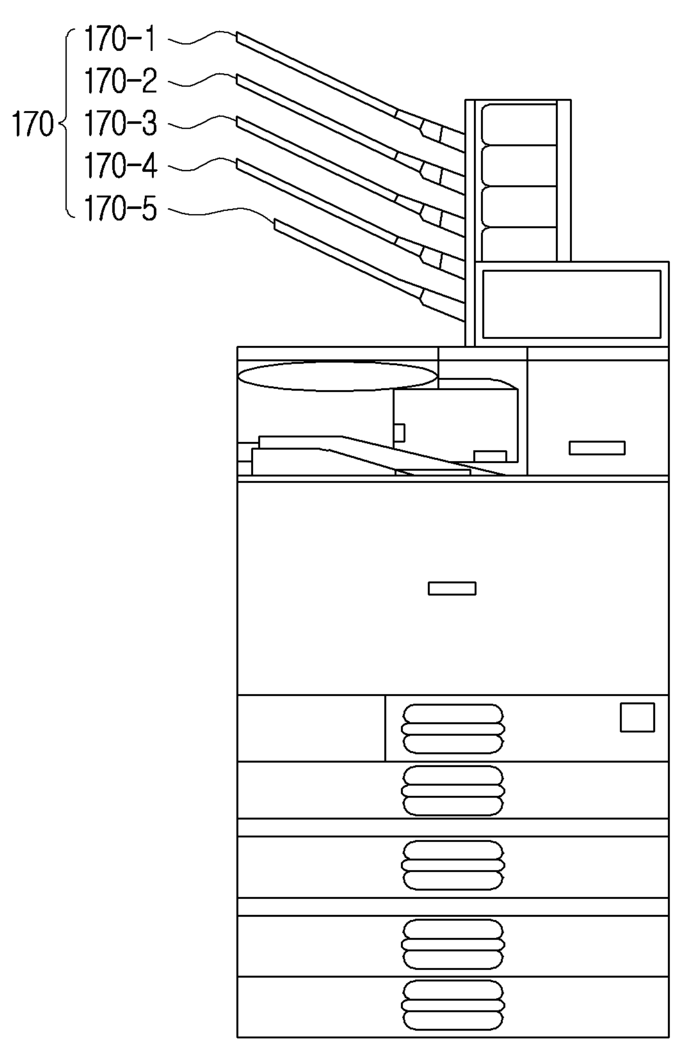
FIG. 8 is a diagram illustrating an image forming apparatus including a plurality of trays according to an example.

FIG. 8 is a diagram illustrating an image forming apparatus including a plurality of trays according to an example.

Referring to FIG. 8, each of the plurality of trays 170 may be a space in which sheets, based on completion of an image forming job, are output and stacked. In an example, the sheets completed with the image forming job may be fed to the tray 170 by the outputting part 160.

According to an example, five trays 170-1, 170-2, 170-3, 170-4, and 170-5 are illustrated in FIG. 8, but the example is not limited thereto. In other examples, there may be more or fewer trays provided.

Figure 9:
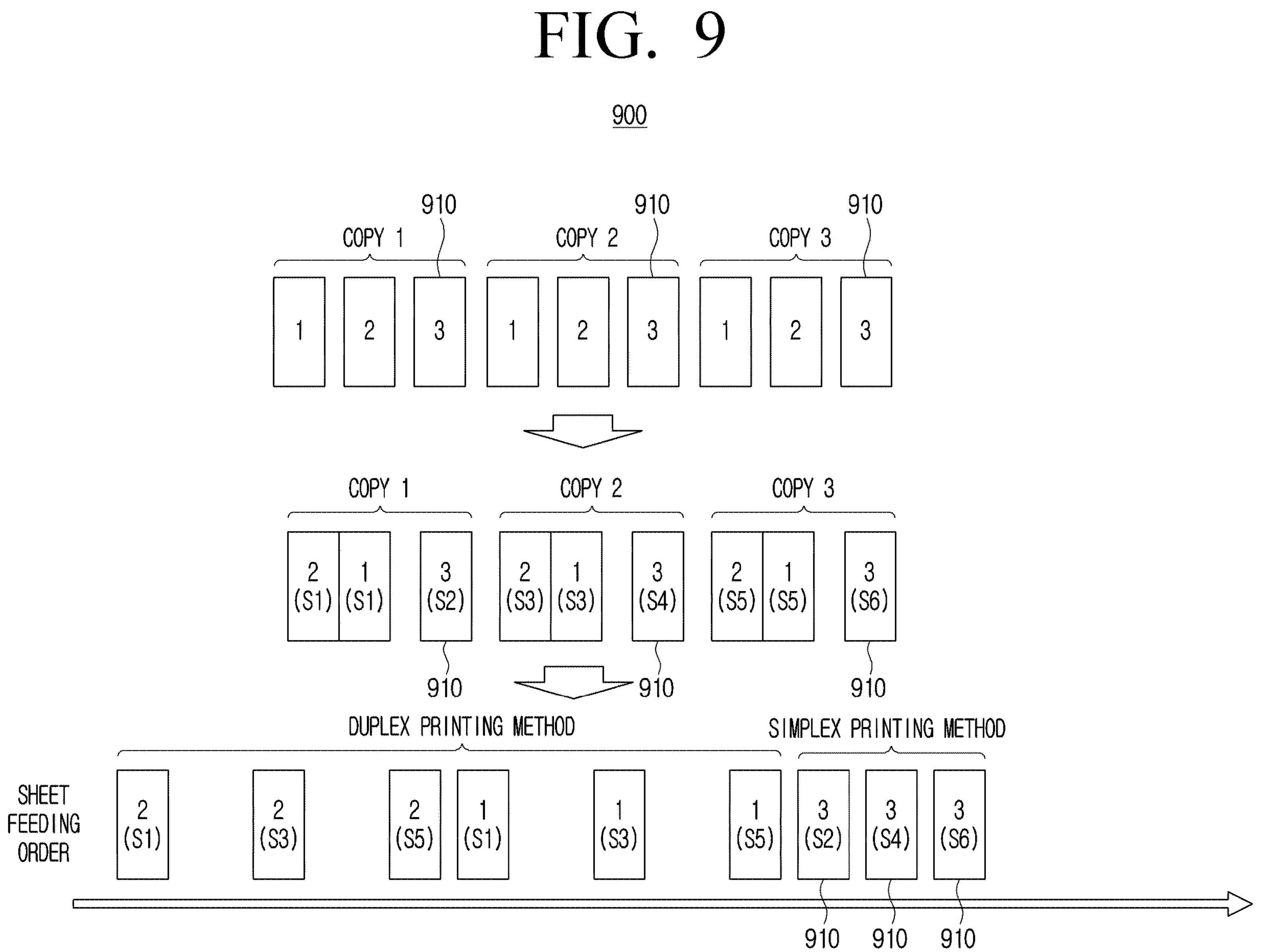
FIG. 9 is a diagram illustrating a print method of a plurality of copies of an odd number page document according to an example.

FIG. 9 is a diagram illustrating a print method of a plurality of copies of an odd number page document according to an example.

Referring to FIG. 9, based on a total page number of a document being an odd number and receiving a print command of duplex printing the document into a plurality of copies, the processor 130 may obtain reconfiguration 900 by reconfiguring the printing order of the remaining pages of the plurality of copies except for a last page 910 of the document, and add the last page 910 of the plurality of copies to reconfigure the whole printing order on the plurality of copies to one print job.

According to an example, based on printing three copies of a 3-page document, the printing order on pages 1 and 2, which are the remaining pages except for the last page 910 of the document, may be reconfigured first, and the printing order may be reconfigured to one print job by adding page 3, which is the last page 910 by a plurality of copies.

The processor 130 may control the image forming part 110 to print the remaining pages of the plurality of copies except for the last page 910 of the plurality of copies using the duplex printing method according to the reconfigured printing order. Further, the processor 130 may control the image forming part 110 to print the last page 910 of the respective copies using the simplex printing method.

According to an example, the outputting part 160 may output the duplex printed sheets S1, S3, and S5 to the respective trays 170-1 to 170-3 for each copy, and the last page 910 of each copy may be output on the duplex printed sheets S1, S3, and S5, respectively.

According to an example, the duplex printed first sheet S1 may be output to a first tray 170-1, the duplex printed second sheet S3 may be output to a second tray 170-2, and the duplex printed third sheet S5 may be output to a third tray 170-3.

Based on the sheets S2, S4, and S6 of the last page 910 of the simplex printed document being respectively output on the duplex printed sheets, the duplex printed document may be output by one copy in the respective trays 170-1 to 170-3.

With respect to the total printing time, based on outputting to one tray 170 as in FIG. 5, the time spent is the time in printing a total of fifteen pages. However, based on outputting to the plurality of trays 170-1 to 170-3 as in FIG. 9, the time spent is the time in printing a total of thirteen pages. Accordingly, based on outputting to the respective trays 170-1 to 170-5, there may be the effect reducing printing time.

In an example in which a print command is received for a number of copies that is greater than the number of the plurality of trays 170, after outputting a number of copies corresponding to the number of trays 170 to the respective trays 170 as described above, the remaining copies may be output again in the respective trays 170.

In an example in which the image forming apparatus 100 includes five trays 170, based on a print command for thirteen copies being input, five copies may be output to the respective trays 170-1 to 170-5, another five copies may be output to the respective trays 170-1 to 170-5 again, and the remaining three copies may be output to the trays 170-1 to 170-3.

According to an example, based on the total page number of the plurality of copies input as the print command being greater than or equal to a threshold value, the processor 130 may control the outputting part 160 to output the sheets completed with the image forming job to the remaining trays except for one from among the plurality of trays 170.

The threshold value may be set taking into consideration a function, a frequency of the image forming job, or the like of the image forming apparatus, but is not limited thereto.

According to an example, based on the threshold value being thirty pages and receiving a command for printing a 3-page document into thirteen copies, because the total page number is thirty-nine pages which is greater than or equal to the threshold value, the processor 130 may control the outputting part 160 to output the printed sheets to the remaining trays 170-1 to 170-4 except for one 170-5 from among the plurality of trays 170.

According to an example, based on receiving an interrupt print command from among the image forming jobs of which the total page number is greater than or equal to the threshold, the processor 130 may control the image forming part 110 to perform the image forming job according to the interrupt print command, and control the outputting part 160 to output the sheet printed by the interrupt print command to the excluded one tray 170-5.

The interrupt print command may refer to performing an image forming job of another document in the midst of the image forming job of the image forming apparatus 100, and may be a print command which allows the outputting of another document to be performed first in the midst of an image forming job which takes a long time.

The processor 130 may reconfigure the printing order of the page to perform the image forming job with respect to the interrupt print command, and control the sheet-feeding part 120 to feed the sheets according to the reconfigured printing order.

A description has been provided of the 3-batch type sheet-feeding part 120 as an example. However, because the same may be applied to a 2-batch or to a batch greater than a 3-batch, separate descriptions thereof will be omitted.

Figure 10:
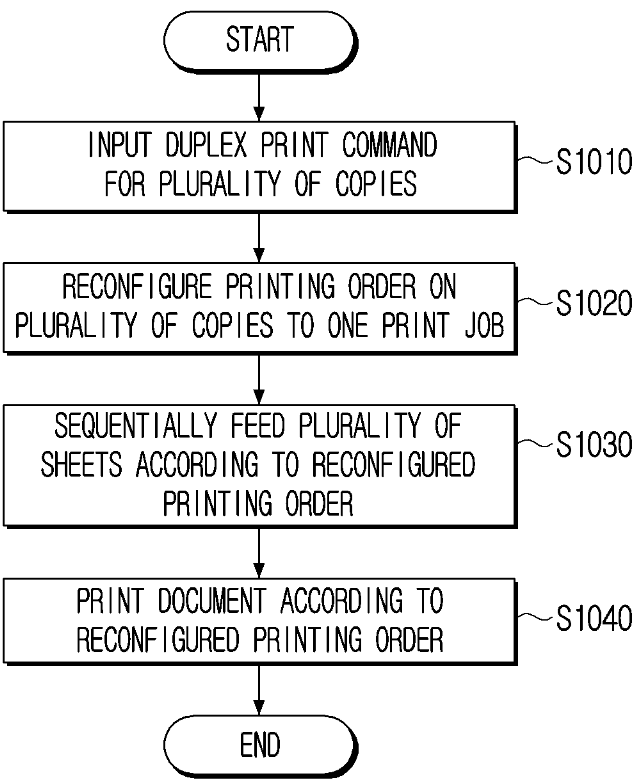
FIG. 10 is a flowchart illustrating a document print method of an image forming apparatus according to an example.

FIG. 10 is a flowchart illustrating a document print method of an image forming apparatus according to an example.

According to FIG. 10, a document printing method of an image forming apparatus may include receiving a print command to duplex print a document into a plurality of copies in operation S1010. A printing order on the plurality of copies may be reconfigured to one print job with respect to the print command in operation S1020. The plurality of sheets may be sequentially fed according to the reconfigured printing order in operation S1030, and the document may be printed according to the reconfigured printing order in operation S1040.

Because examples associated with reconfiguring the printing order on the plurality of copies to one print job and examples associated with sequentially feeding the plurality of sheets have been described above, redundant descriptions thereof will be omitted.

FIG. 11 to FIG. 15 are flowcharts illustrating a document print method of an image forming apparatus according to various examples.

Figure 11:
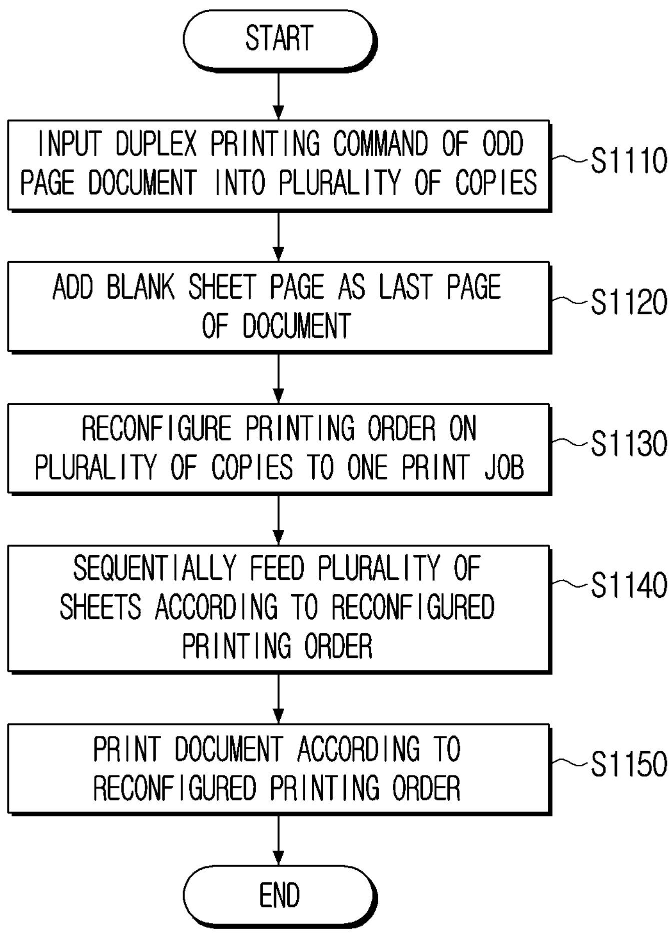
FIG. 11 to FIG. 15 are flowcharts illustrating document print methods of an image forming apparatus according to various examples.

According to FIG. 11, a document printing method of an image forming apparatus may include, based on receiving a command for duplex printing a document including an odd number of pages into a plurality of copies in operation S1110, adding the blank sheet page as the last page of the document to make the total page number of the document an even number in operation S1120, and reconfiguring the printing order on the plurality of copies to one print job in operation S1130. The method may further include sequentially feeding the plurality of sheets according to the reconfigured printing order in operation S1140, and printing the document according to the reconfigured printing order in operation S1150.

Because examples associated with adding the blank sheet page have been described above, redundant descriptions thereof will be omitted.

Figure 12:
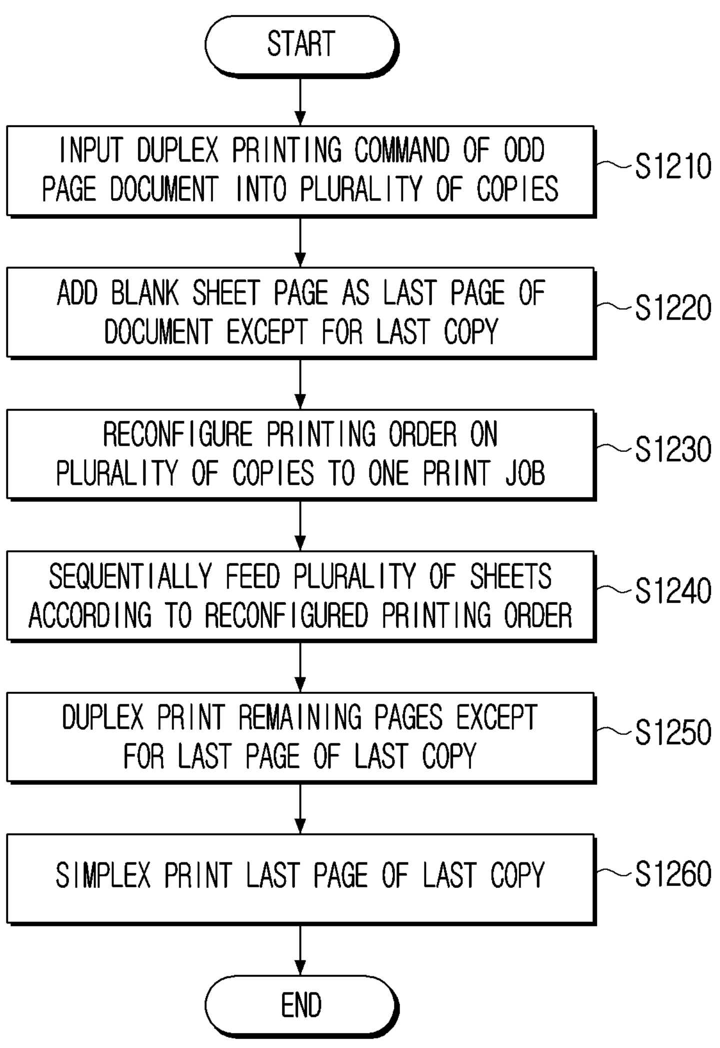

According to FIG. 12, a document printing method of an image forming apparatus may include, based on receiving a command to duplex print a document which includes an odd number of total pages into a plurality of copies in operation S1210, adding a blank sheet page as the last page of the document except for the last copy to make the total page number of the document except for the last copy an even number in operation S1220, and reconfiguring the printing order on the plurality of copies to one print job in operation S1230. The method may further include sequentially feeding the plurality of sheets according to the reconfigured printing order in operation S1240, printing the remaining pages except for the last page of the last copy using the duplex printing method in operation S1250, and printing the last page of the last copy using the simplex printing method in operation S1260.

Because examples associated with adding the blank sheet page to the last of the document except for the last copy and examples associated with simplex printing the last page of the last copy have been described above, redundant descriptions thereof will be omitted.

Figure 13:
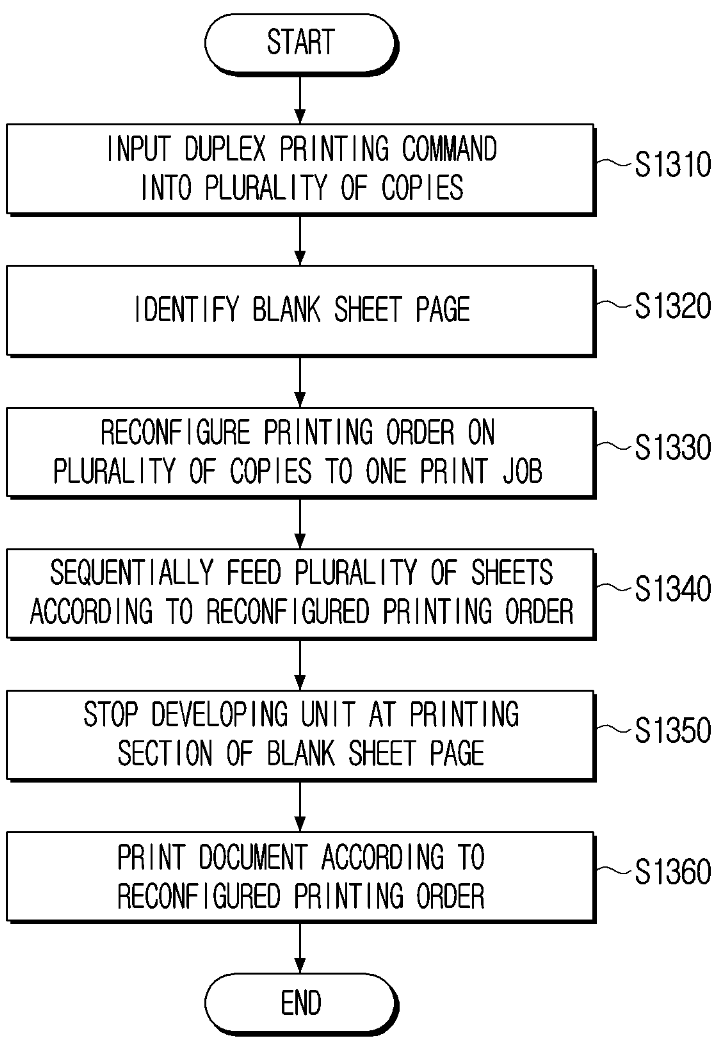

According to FIG. 13, a document printing method of an image forming apparatus may include, based on receiving a print command in operation S1310, identifying a blank sheet page included in a document in operation S1320, reconfiguring the printing order on the plurality of copies to one print job in operation S1330, sequentially feeding the plurality of sheets according to the reconfigured printing order in operation S1340, and stopping the developing unit at the print section of the blank sheet page in operation S1350. In addition, the method may further include printing the document according to the reconfigured printing order in operation S1360.

Because examples associated with identifying the blank sheet page and examples associated with stopping the developing unit have been described above, redundant descriptions thereof will be omitted.

Figure 14:
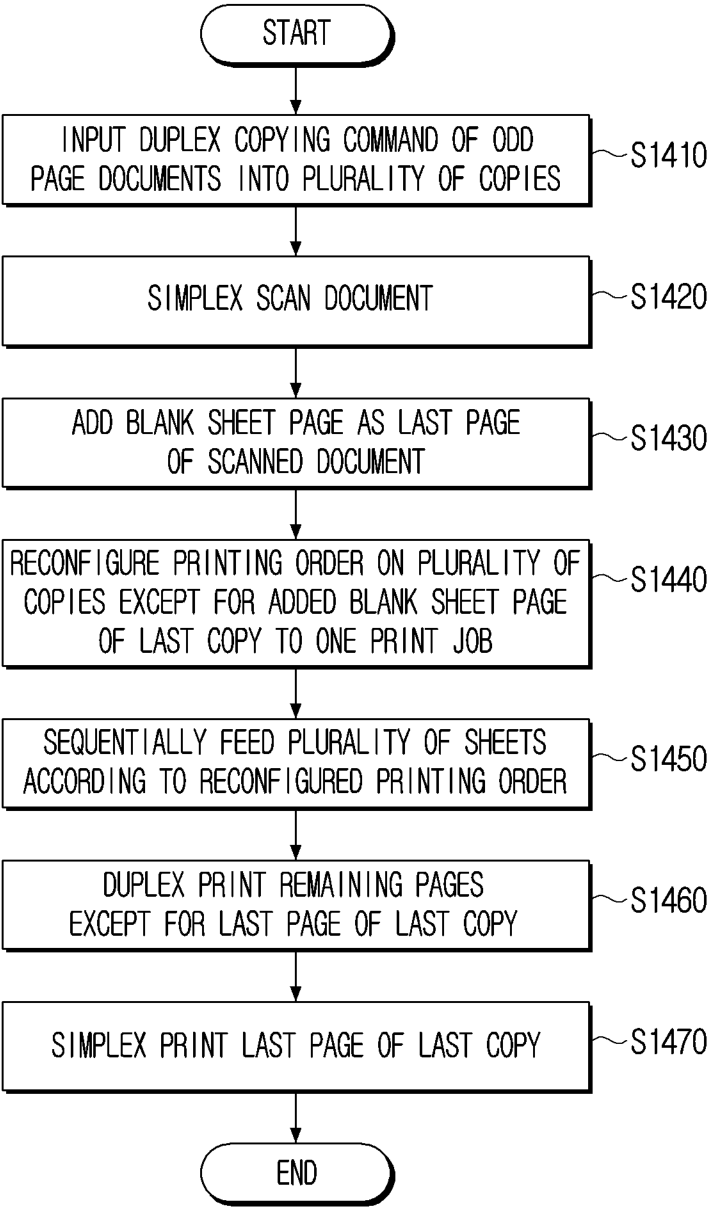

According to FIG. 14, a document printing method of an image forming apparatus may include, based on receiving a copy command for duplex copying a simplex printed document having an odd number of pages into a plurality of copies in operation S1410, simplex scanning the document in operation S1420, adding a blank sheet page as the last page of the scanned document to make the total page number of the scanned document an even number in operation S1430, and reconfiguring the printing order on the plurality of copies except for the added blank sheet page of the last copy of the scanned document to one print job in operation S1440. The method may further include sequentially feeding the plurality of sheets according to the reconfigured printing order in operation S1450, printing the remaining pages except for the last page of the last copy using the duplex printing method in operation S1460, and printing the last page of the last copy using the simplex printing method in operation S1470.

Because examples associated with simplex scanning the document and examples associated with reconfiguring the printing order on the plurality of copies except for the added blank sheet page of the last copy of the scanned document to one print job have been described above, redundant descriptions thereof will be omitted.

Figure 15:
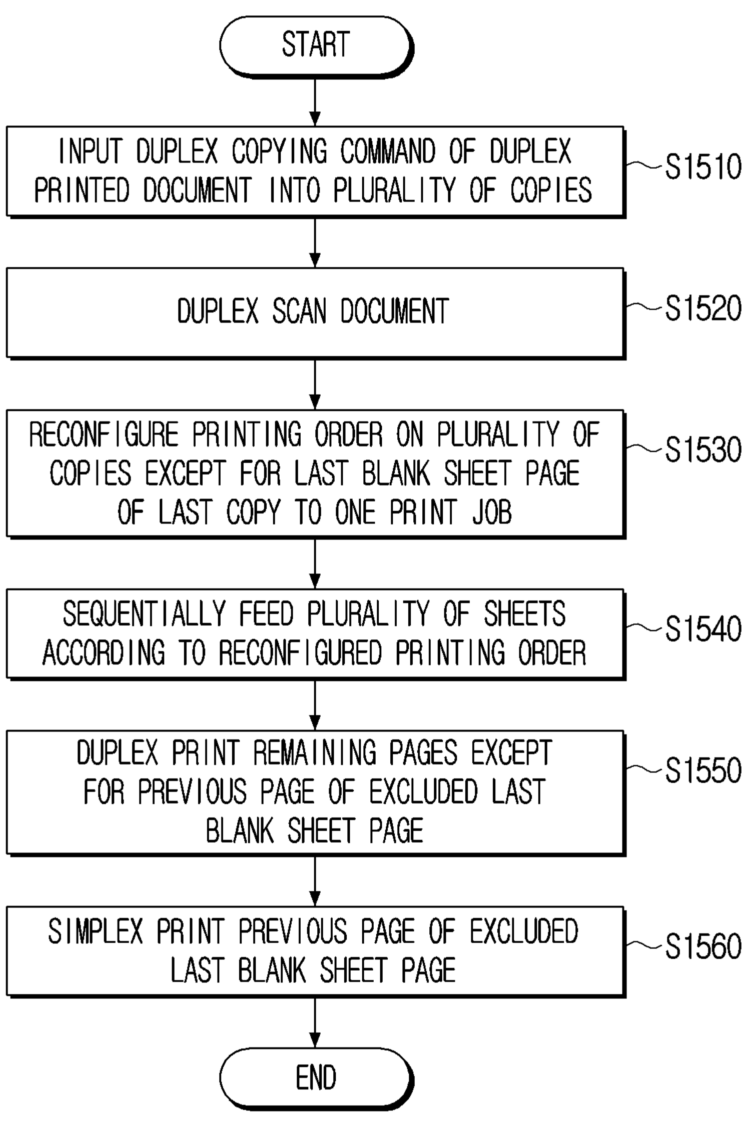

According to FIG. 15, a document printing method of an image forming apparatus may include, based on receiving a copy command for duplex copying a duplex printed document into a plurality of copies in operation S1510, duplex scanning the document in operation S1520, and, based on the last page of the scanned document being a blank sheet page, reconfiguring the printing order on the plurality of copies except for the last blank sheet page of the last copy to one print job in operation S1530. The method may further include sequentially feeding the plurality of sheets according to the reconfigured printing order in operation S1540, printing the remaining pages except for the previous page of the excluded last blank sheet page using the duplex printing method in operation S1550, and printing the previous page of the excluded last page using the simplex printing method in operation S1560.

Because examples associated with duplex scanning the document and examples associated with reconfiguring the printing order on the plurality of copies except for the last blank sheet page of the last copy to one print job have been described above, redundant descriptions thereof will be omitted.

The above-described examples may be implemented in the form of a non-transitory computer readable recording medium which stores instructions executable by a computer and data. At least one from among the instructions or data may be stored in the form of a program code, and based on being executed by the processor, a predetermined program module may be generated to perform a predetermined operation.

Figure 16:
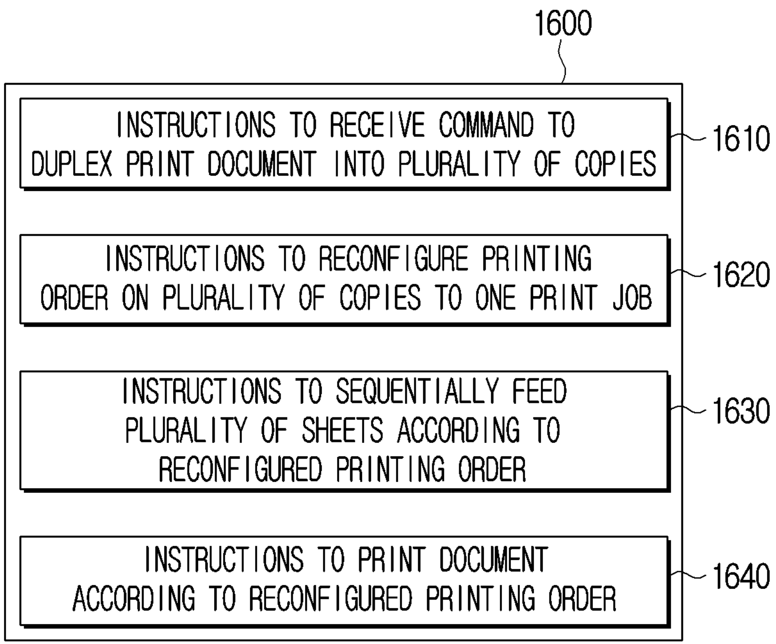
FIG. 16 is a diagram illustrating instructions stored in a non-transitory computer readable recording medium according to an example.

FIG. 16 is a diagram illustrating instructions stored in a non-transitory computer readable recording medium according to an example.

A non-transitory computer readable recording medium 1600 may store instructions associated with an operation of the above-described image forming apparatus.

According to an example, the non-transitory computer readable recording medium 1600 may include instructions to receive a print command to duplex print a document into a plurality of copies 1610, instructions to reconfigure a printing order of the plurality of copies to one print job 1620, instructions to sequentially feed the plurality of sheets according to the reconfigured printing order 1630, and instructions to print the document according to the reconfigured printing order 1640.

Each instruction may be made in a program language of various forms and recorded. In addition, each instruction may be combined with at least one other instruction and stored in a non-transitory recording medium.

The non-transitory computer readable recording medium as described above may be a read-only memory (ROM), a random-access memory (RAM), a flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, a magnetic tape, a floppy disk, a magnetic-optic data storage device, an optical data storage device, a hard disk, a solid-state disk (SSD), and any device capable of storing machine readable instructions, related data, data files, and data structures, and of providing machine readable instructions, related data, data files, and data structures to the processor or the computer for the processor or the computer to execute the instructions.

While the disclosure has been illustrated and described with reference to various examples thereof, the disclosure is not limited to the examples described above, and it will be understood that various changes in form and details may be made therein without departing from the spirit and full scope, including the appended claims and their equivalents.

What is claimed is:

1. An image forming apparatus, comprising:

an image forming part;

a plurality of batches type sheet-feeding part to sequentially feed a plurality of sheets;

an outputting part disposed to feed sheets with image forming jobs completed;

a plurality of trays; and a processor, wherein the processor is to:

reconfigure, based on receiving a print command to duplex print a document having an odd number of total pages into a plurality of copies, a printing order of remaining pages of the plurality of copies except for a last page of the document to one print job with respect to the print command, add a last page of the plurality of copies to reconfigure a whole printing order of the plurality of copies to one print job, control the image forming part to print the remaining pages of the plurality of copies except for the last page of the plurality of copies using a duplex printing method and print the last page of the respective copies using a simplex printing method, and control the outputting part to output the duplex printed sheet to the respective trays for each copy and output the last page of each copy on the duplex printed sheets, respectively.

2. The image forming apparatus of claim 1, wherein the processor is to:

add, based on the print command being a command to duplex print a document having an odd number of total pages into a plurality of copies, a blank sheet page as a last page of the document to make a total page number of the document an even number, and reconfigure a printing order of the plurality of copies to one print job.

3. The image forming apparatus of claim 1, wherein the processor is to:

add, based on the print command being a command to duplex print a document having an odd number of total pages into a plurality of copies, a blank sheet page as a last page of the document except for a last copy to make a total page number of the document except for the last copy an even number, reconfigure a printing order of the plurality of copies to one print job, and control the image forming part to print remaining pages except for a last page of the last copy using a duplex printing method and print the last page of the last copy using a simplex printing method.

4. The image forming apparatus of claim 1, further comprising: a memory, wherein the image forming part further includes a developing unit, and wherein the processor is to:

store, based on receiving the print command, information on a blank sheet page included in the document in the memory, and control, based on information stored in the memory, the image forming part to stop the developing unit at a print section of the blank sheet page.

5. The image forming apparatus of claim 1, further comprising: a scanning part, wherein the processor is to:

control, based on receiving a copy command for duplex copying a simplex printed document having an odd number of total pages into a plurality of copies, the scanning part to simplex scan the document;

add a blank sheet page as a last page of the scanned document to make a total page number of the scanned document an even number, reconfigure a printing order of the plurality of copies except for the added blank sheet page of a last copy of the scanned document to one print job, and control the image forming part to print remaining pages except for a last page of the last copy using a duplex printing method and print the last page of the last copy using a simplex printing method.

6. The image forming apparatus of claim 1, further comprising: a scanning part, wherein the processor is to:

control, based on receiving a copy command for duplex copying a duplex printed document into a plurality of copies, the scanning part to duplex scan the document;

reconfigure, based on a last page of the scanned document being a blank sheet page, a printing order of the plurality of copies except for the last blank sheet page of the last copy to one print job; and control the image forming part to print remaining pages except for a previous page of the excluded last blank sheet page using a duplex printing method and print the previous page of the excluded last blank sheet page using a simplex printing method.

7. The image forming apparatus of claim 1, wherein the processor is to:

control, based on a total page number of the plurality of copies being greater than or equal to a threshold value, the outputting part to output the printed sheet to remaining trays except for one from among the plurality of trays, control, based on receiving an interrupt print command, the image forming part to perform the image forming job according to the interrupt print command, and control the outputting part to output the sheet printed by the interrupt print command to the excluded one tray.

8. The method of claim 7, wherein the reconfiguring comprises adding, based on receiving a command to duplex print a document having an odd number of total pages into a plurality of copies, a blank sheet page as a last page of the document except for a last copy to make a total page number of the document except for the last copy an even number, and reconfiguring the printing order of the plurality of copies to one print job, and wherein the printing the document comprises printing remaining pages except for a last page of the last copy using a duplex printing method, and printing the last page of the last copy using a simplex printing method.

9. A document printing method of an image forming apparatus, comprising:

reconfiguring, based on receiving a print command to duplex print a document having an odd number of total pages into a plurality of copies, a printing order of remaining pages of the plurality of copies except for a last page of the document to one print job with respect to the print command;

adding a last page of the plurality of copies to reconfigure a whole printing order of the plurality of copies to one print job;

sequentially feeding a plurality of sheets according to the reconfigured printing order; and printing the remaining pages of the plurality of copies except for the last page of the plurality of copies using a duplex printing method and printing the last page of the respective copies using a simplex printing method; and outputting the duplex printed sheet to respective trays for each copy and outputting the last page of each copy on the duplex printed sheets, respectively.

10. The method of claim 9, wherein the reconfiguring comprises adding, based on receiving a command to duplex print a document having an odd number of total pages into a plurality of copies, a blank sheet page as a last page of the document to make a total page number of the document an even number, and reconfiguring the printing order of the plurality of copies to one print job.

11. The method of claim 9, further comprising:

identifying, based on receiving the print command, a blank sheet page included in the document; and stopping a developing unit at a print section of the blank sheet page.

12. The method of claim 9, further comprising:

duplex scanning, based on receiving a copy command for duplex copying a duplex printed document into a plurality of copies, the document; and reconfiguring, based on a last page of the scanned document being a blank sheet page, the printing order of the plurality of copies except for a last blank sheet page of a last copy to one print job, wherein the printing the document comprises printing remaining pages except for a previous page of the excluded last blank sheet page using a duplex printing method and printing the previous page of the excluded last blank sheet page using a simplex printing method.

13. A non-transitory recording medium including instructions to perform a document printing method of an image forming apparatus, the non-transitory recording medium comprising:

instructions to reconfigure, based on receiving a print command to duplex print a document having an odd number of total pages into a plurality of copies, a printing order of remaining pages of the plurality of copies except for a last page of the document to one print job with respect to the print command;

instructions to add a last page of the plurality of copies to reconfigure a whole printing order of the plurality of copies to one print job;

instructions to sequentially feed a plurality of sheets according to the reconfigured printing order; and instructions to print the remaining pages of the plurality of copies except for the last page of the plurality of copies using a duplex printing method and print the last page of the respective copies using a simplex printing method; and instructions to output the duplex printed sheet to respective trays for each copy and output the last page of each copy on the duplex printed sheets, respectively.

* * * * *